United States Patent [19]

Abbott

[11] 4,179,703
[45] Dec. 18, 1979

[54] SYSTEM FOR TRANSMITTING TWO COLOR TV SIGNALS

[75] Inventor: Liston Abbott, E. Windsor, N.J.

[73] Assignee: RCA Corporation, New York, N.Y.

[21] Appl. No.: 927,628

[22] Filed: Jul. 24, 1978

[51] Int. Cl.² .............................................. H04N 9/00
[52] U.S. Cl. ...................................... 358/11; 358/12; 358/37
[58] Field of Search ...................... 358/11, 12, 37, 15, 358/16, 23, 25, 35, 36

[56] References Cited

U.S. PATENT DOCUMENTS 4,120,001  10/1978  Abbott et al. ........................... 358/11

Primary Examiner—Robert L. Richardson
Attorney, Agent, or Firm—Samuel Cohen; Carl V. Olson

[57] ABSTRACT

In a system in which alternate lines of one color television video signal normally are delayed half the period of the color subcarrier at a transmitting terminal to minimize the cross modulation of the color subcarrier with the color subcarrier of another video signal amplified in a common amplifier such as in a satellite transponder, an intermediate line delay unit at the receiving terminal is normally operative to delay intermediate lines of the one video signal half the period of the color subcarrier, and is automatically inhibited from delaying intermediate lines of the one video signal when the received alternate lines of said one video signal are for any reasons not delayed at the transmitting terminal.

6 Claims, 8 Drawing Figures

SYSTEM FOR TRANSMITTING TWO COLOR TV SIGNALS

This invention relates to systems of the transmission of two color television signals over a common non-linear path. The invention is especially useful in systems in which a plurality of different color television signals are transmitted from a ground station to a satellite in which the signals are amplified and then returned to a ground station remote from the transmitting ground station. The receiving ground station may forward the television signals to nearby television transmitting stations which broadcast to television receivers in a local area of about 50 miles radius.

The amplifiers in the transponders in the satellites are traveling-wave-tube amplifiers because they are light in weight, use a minimum of electric power and have high gain. The requirements are such that the amplifiers cannot be made to have a linear amplification characteristic. This is not a serious disadvantage bacause normally only one color television signal is amplified in each transponder. However, when it is desired to amplify two color television signals in a single transponder, the color subcarriers of the two signals cross modulate each other in the non-linear traveling wave tube amplifier. The color subcarriers in NTSC video signals from different sources may differ from the standard frequency of 3.58 MHz by any amount up to 10 Hz, and thus may differ from each other by up to 20 Hz. The cross modulation of cross talk in the transponder of the two subcarriers results in a visible disturbing color flicker on the screens of television monitors and receivers.

In accordance with the teachings of a prior application, U.S. Ser. No. 751,795, now U.S. Pat. No. 4,120,001 filed by Liston Abbott et al. on Dec. 17, 1976, entitled, "System For Passing Two Color TV Signals Through Non-Linear Path," and assigned to the same assignee as the present application, the color flicker on the screen of a monitor or receiver is made invisible to the human eye by delaying alternate lines of one of the two video signals by half the period of the color subcarriers at the transmitting terminal, and by delaying intermediate lines of the same one of the two video signals by half the period of the color subcarrier at the receiving terminal.

If there is a failure of the means at the transmitting terminal for delaying the one video signal, the continued delaying of the signal at the receiving terminal results in a signal in which the color information is cancelled and the signal produces only a black and white picture on a television screen.

According to an example of the present invention, the receiving terminal is provided with means to detect a failure of the transmitting terminal to delay the one video signal, and to automatically discontinue delaying the video signal at the receiving terminal, so that the signal produces a color TV picture on television screens.

Figure 1:
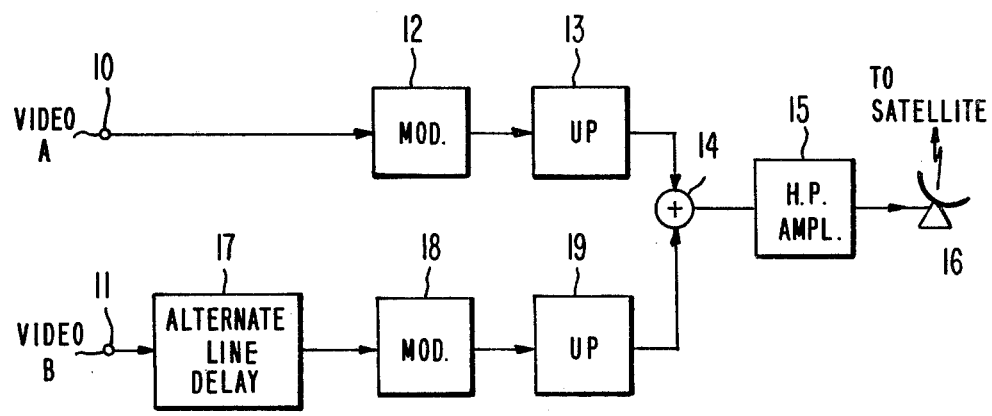
FIG. 1 is a block diagram of equipment at a ground station for transmitting two television signals up to a repeater satellite.

Referring now to the transmitting equipment in FIG. 1, one NTSC composite video television signal A is applied to an input terminal 10, and another NTSC composite video television signal B is applied to an input terminal 11. Video signal A is used to frequency modulate a carrier wave in modulator 12. The output of the modulator is translated up in unit 13 to a higher frequency, such as one in the 6 GHz range, which is passed through a signal adder 14 and a highpower (H.P.) amplifier 15 feeding an antenna 16 pointed to a repeater satellite (not shown). The other video signal B is applied from input terminal 11 through an alternate line delay circuit 17 before being applied through a modulator 18 (like modulator 12) and an up converter 19 to the signal adder 14. The signal outputs of the up converters 13 and 19 each occupy a different half of the frequency range passed by the amplifier 15 and the transponder in the satellite. A suitable alternate line delay circuit is shown in detail in FIG. 3.

Figure 2:
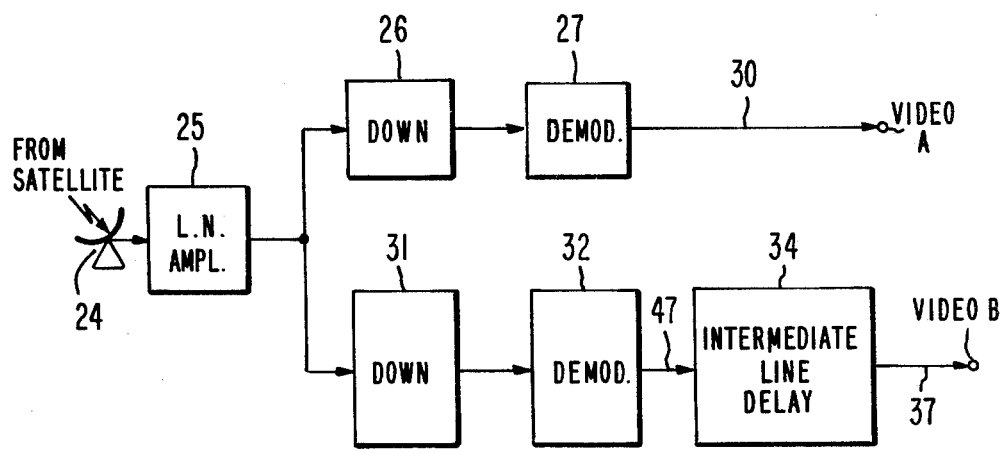
FIG. 2 is a block diagram of equipment at a remote ground station for receiving the two television signals from the satellite.

The receiving equipment shown in FIG. 2 is at a remote location on the earth and has an antenna 24 for receiving the combined television signal relayed from the satellite at a frequency such as 4 GHz. The received signal is passed through a low-noise-amplifier 25, and then divided on the basis of frequency into two paths, one of which is an A-signal path including a frequency down converter 26, and a demodulator 27 to an output line 30 carrying the NTSC composite video signal A originally supplied to terminal 10 in FIG. 1. The other B-signal path includes a frequency down converter 31, a demodulator 32, and a intermediate line delay circuit 34, connected to an output line 37 carrying the NTSC composite video signal originally supplied to terminal 11 in FIG. 1.

Figure 3:
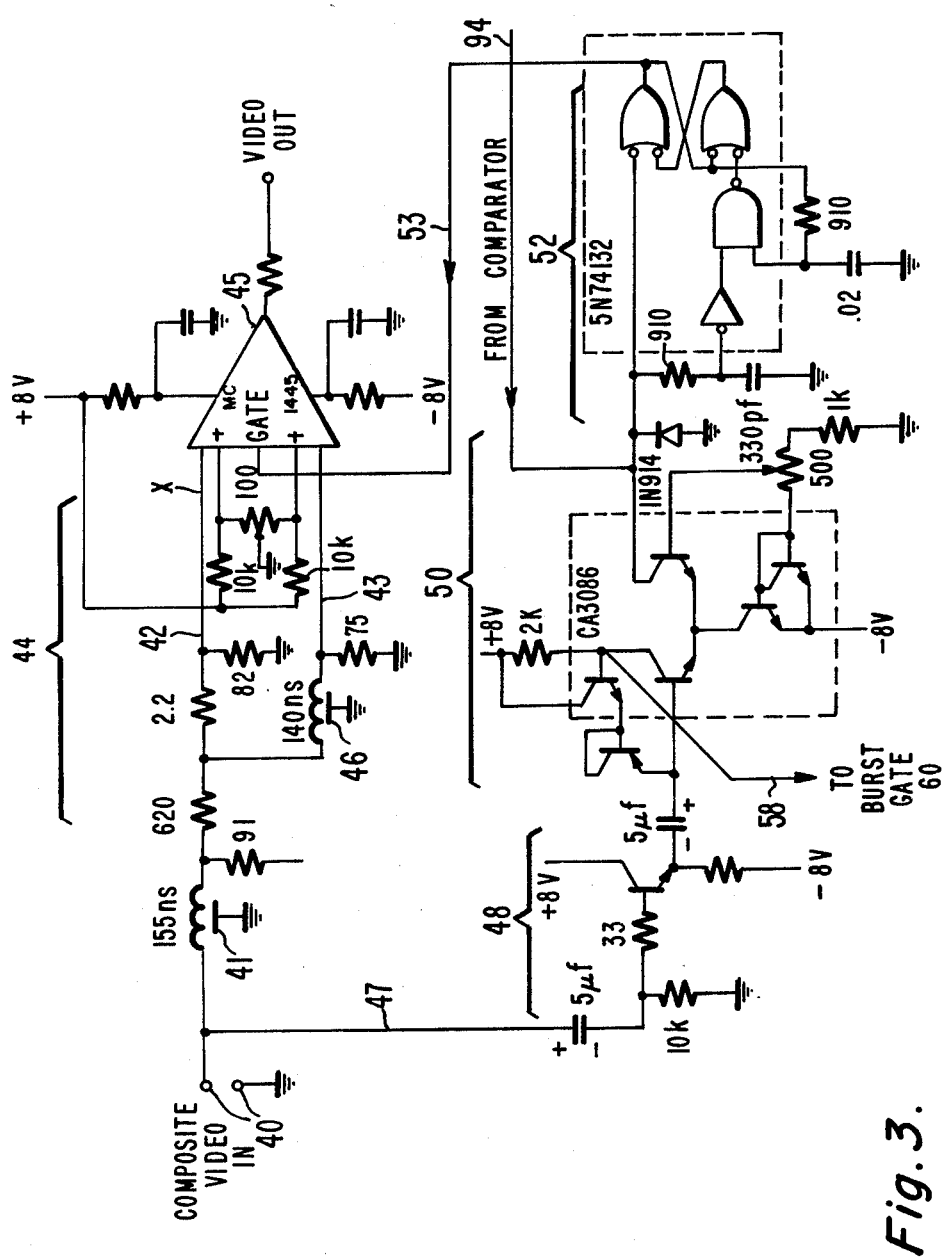
FIG. 3 is a schematic diagram of a line delay circuit which may be employed in the transmitting and receiving equipments of FIGS. 1 and 2.

The alternate line delay unit 17 in FIG. 1 and the intermediate line delay unit 34 in FIG. 2 may both be constructed as shown in FIG. 3. A composite video signal input terminal 40 is coupled through a 155-nanosecond delay unit 41 and through two paths 42 and 43 of an attenuating and impedance matching network 44 to two respective input terminals X and Y of a switching amplifier 45. The path to input terminal Y includes a 140-nanosecond delay unit 46 which delays the video signal an amount equal to a half cycle of the color subcarrier having a frequency of 3.58 MHz.

The delay unit 41 is provided for the purpose of compensating for the delay introduced by gate generator circuits in path 47 including an emitter follower 48, a sync clamp and stripper 50 and an alternate line gate signal generator 52 having an output connected over line 53 to the "gate" input of the switching amplifier 45. The alternate line gate circuit 52 responds to the composite sync signal from circuit 50 to produce a gate signal on line 53 which causes the switching amplifier 45 to pass alternate horizontal lines of the video signal delayed by delay unit 46 and applied to input Y of switching amplifier 45, and to pass intermediate horizontal lines of the undelayed video signal applied to input X of the switching amplifier 45.

The alternate line gate signal from generator 52 is also characterized in being asymmetrical so that all horizontal synchronizing pulses appearing at the output of switching amplifier 45 are from the undelayed video signal applied to input terminal X of the switch 45. The alternate horizontal lines delayed by delay device 46 and passed through switch 45 includes solely the video horizontal line signals existing between the horizontal synchronizing pulses. Alternate video horizontal lines are delayed, but alternate horizontal pulses are not delayed. This arrangement prevents the horizontal synchronizing pulses appearing at the output of switching amplifier 45 from being alternately delayed and undelayed, a condition which would interfere with horizontal synchronization of pictures on the faces of TV monitors and receivers to which the output video signal might be applied.

The circuit of FIG. 3 used as the alternate line delay circuit 17 in the transmitting system of FIG. 1, may be used, with a slight modification, as the intermediate line delay circuit 34 in the receiving system of FIG. 2. The modification consists of transposing the connections to the inputs of switching amplifier 45 so that path 42 is connected to input Y, and signal-delaying path 43 is connected to input X. The result of this transportation at the receiver of FIG. 2 is to delay the horizontal lines which were not delayed in the transmitter of FIG. 1. Stated another way, the unit 17 in FIG. 1 delays alternate horizontal lines, and the unit 34 in FIG. 2 delays intermediate horizontal lines. All horizontal lines are delayed once before being applied to a color TV monitor or receiver. If the intermediate line delay unit 34 is omitted from FIG. 2, there will be a humanly visible cancellation of the chrominance signal due to an addition of 180-degree-out-of-phase color subcarriers on adjacent horizontal lines of monitors and receivers.

Figure 4:
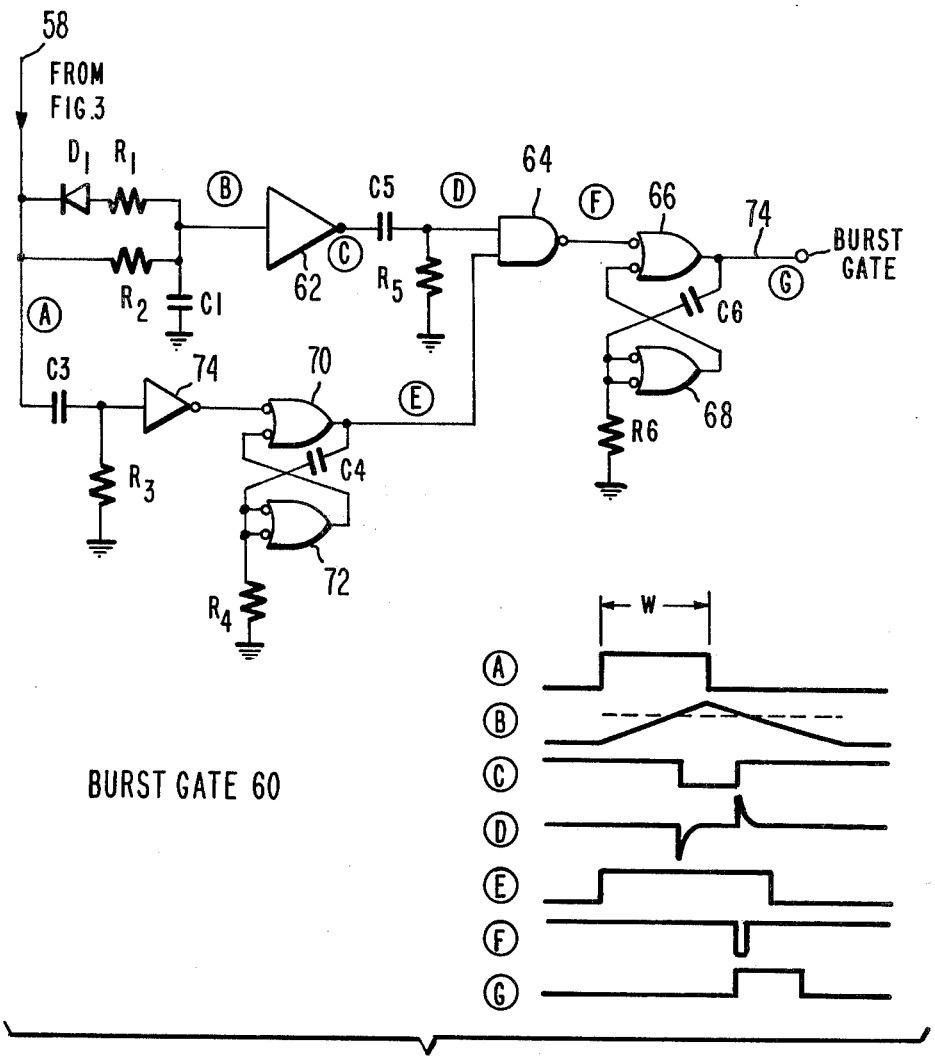
FIG. 4 is a diagram of a circuit for generating a burst gate pulse coextensive in time with the color sub-carrier burst.

An output on line 58 from the circuit 50 in FIG. 3 is connected to the input of any suitable burst gate generating circuit 60 such as the one shown in FIG. 4. The wave-form, on the line 58 is a stripped sync pulse which has a duration (w) of 4.71 $\mu$s for horizontal sync pulses, 2.33 $\mu$s for equalizing pulses, and 27.25 $\mu$s for vertical sync pulses The required burst gate signal, waveform G, should have its positive-going leading edge occurring 1 $\mu$s after the end of each horizontal sync pulse and should have a duration of 2.3 $\mu$s. The burst gate is not generated following the equalizing or vertical pulses.

In the operation of the circuit of FIG. 4, the rising edge of the sync pulse causes capacitor $C_1$ to be charged positively through resistor $R_2$. When the voltage reaches a given threshold, fixed by the design of the Schmidt-type gate 62, the output of gate 62 goes low. The time constant of the $R_2C_1$ combination is such that the voltage at point B does not reach the threshold specified when the pulse at point A is of short duration, as in the case for the equalizing pulses. When the signal at point A goes low, capacitor $C_1$ is discharged through resistors $R_2$ and $R_1$, and diode $D_1$. The additional discharge path through $R_1$ and $D_1$ causes the discharging rate to be greater than the charging rate. The discharging time constant is arranged so that the voltage at point B falls below the given threshold 1 $\mu$s after the negative going edge of the sync pulse at point A, causing the output of gate 62 to go high, as shown in waveform C. The output signal from gate 62 is differentiated by $C_5$, $R_5$ creating negative and positive-going pulses at point D. When the signal at point E is high, the positive pulses at point D are passed through gate 64 and inverted as shown in waveform F. The signal at point F triggers a one-shot timer composed of gates 66 and 68, $R_6$, and $C_6$. The output of gate 66 is the required burst gate signal as shown in waveform G. The time duration of the burst gate pulse is determined by the $R_6$, $C_6$ combination. The signal at point E goes high coincident with the leading edge of each sync pulse at point A, and goes low about 7 $\mu$s later, as determined by the $R_4$, $C_4$ combination. The one-shot timer composed of gates 70 and 72, $R_4$ and $C_4$ is triggered by the positive going edges of the pulses at point A which are differentiated by $C_3$, $R_3$ and inverted by gate 74. The 27.25 $\mu$s vertical pulses at point A are prevented from causing a burst gate to be generated by the fact that the signal at point E goes low 7 $\mu$s after the start of the vertical pulses and remains low when the trailing edges of the vertical pulses at point A cause positive pulses to occur at point D.

Figure 5:
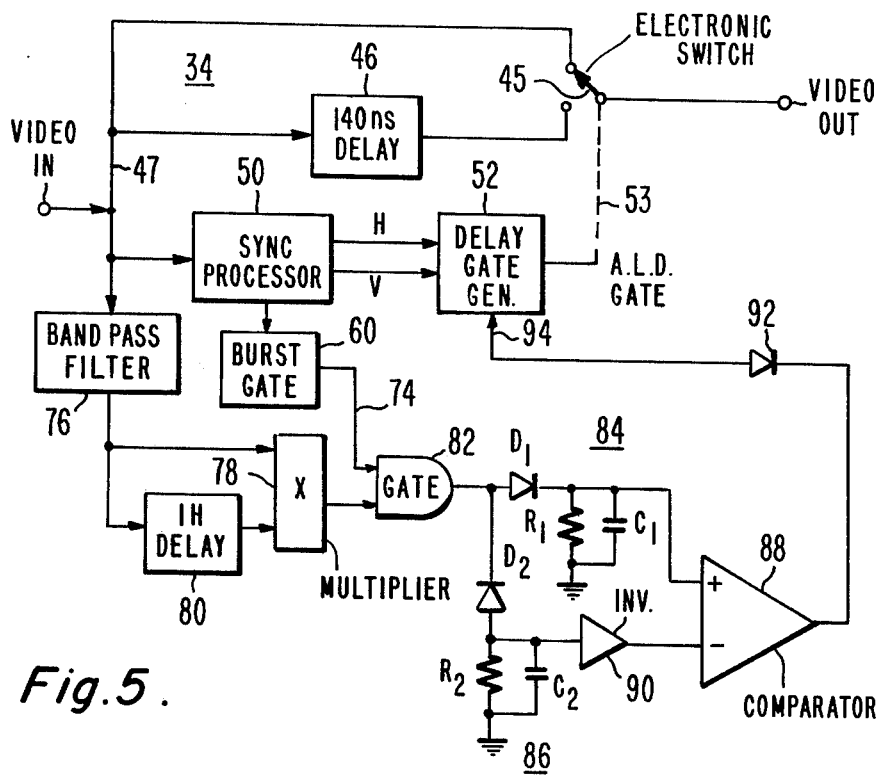
FIG. 5 is a simplified diagram of the line delay circuit of FIG. 3 together with means automatically to inhibit operation of the line delay circuit.

FIG. 5 shows the receiving terminal intermediate line delay circuit of FIG. 3 in block diagram form, together with means for automatically preventing the circuit from delaying intermediate lines of the video signal when alternate lines are, for any reason, not delayed at the transmitting terminal. The intermediate line delay circuit includes the electronic switch 45, the 140 ns delay 46, the sync processor 50 and the delay gate generator 52.

The automatic control circuit includes a bandpass filter 76 for passing frequencies in the vicinity of the color subcarrier burst frequency of 3.58 MHz to a multiplier 78 and through a one-H delay device 80 which delays the video signal an amount equal to the time (63.5 $\mu$s) of one horizontal line of the video signal. The multiplier 78 may be a type CA3091 unit made by RCA Corporation. The product signal output from the multiplier 78 is applied to a transmission gate 82 which is enabled by a pulse on line 74 from the burst gate 60 shown in detail in FIG. 4. The output of the gate is applied to a positive peak detector 84 and to a negative peak detector 86. The output of detector 84 is connected to the non-inverting input of a comparator 88, and the output of detector 86 is connected through an inverter 90 to the inverting input of comparator 88. The output of the comparator is coupled through a diode 92 to a control input 94 of the delay gate generator 52.

In operation, two video signals A and B are transmitted from a transmitting terminal shown in FIG. 1 to a common transponder amplifier in a satellite. Alternate horizontal lines of video signal B are delayed 140 ns (half the period of the color subcarrier at 3.58 MHz) by the alternate line delay unit 17, so that the color subcarrier of signals A and B do not cross modulate each other in the satellite transponder, and do not produce a very low frequency beat note disturbance that would cause flicker on a TV receiver screen. At the receiving terminal of FIG. 2, the intermediate lines of video signal B are delayed by intermediate line delay unit 34, so that both alternate and intermediate lines are equally delayed, and video signal B produces TV pictures as through its lines never had been delayed at the transmitting and receiving terminals.

Now, if alternate lines of video signal B are not delayed at the transmitting terminal of FIG. 1 for any reason, such as failure of the alternate line delay unit 17, the continued delay of intermediate lines in unit 34 at the receiving terminal will cause the output video B signal to have differently-phased bursts on successive lines, so that color sync is lost in TV receivers and only black-and-white pictures can be produced. To prevent this loss of color information, the intermediate line delay unit 34 at the receiving terminal must be inhibited from delaying the intermediate lines. When this is done, and neither the alternate or intermediate lines are delayed, some undesirable flicker of the reproduced color picture results, but this is less objectionable than losing all color information.

FIG. 5 includes means to detect when alternate lines are not delayed at the transmitter, and then to automatically inhibit the intermediate line delay unit 34 from delaying the intermediate lines. If the alternate lines are not delayed at the transmitting terminal, the phases relative to horizontal sync pulses of the color bursts of received video signal B are as represented by the first two waveforms of FIG. 6a. (There is a polarity change in the chrominance signal from one point on a horizontal line to the same point on the next horizontal line. This is inherent in the National Television System Committee color television signal standards adopted by the United States and other countries. The polarity reversal results from the use of $455 \div 2 = 227.5$ subcarrier cycles per horizontal line.) The one-H delay 80 in FIG. 5 permits the two waveforms to be simultaneously presented to multiplier 78. The multiplier output during the burst interval is negative and is gated by gate 82 to positive and negative peak detectors 84 and 86. The large output from the negative peak detector 86 after inversion causes comparator 88 to have a zero volts output which is coupled through diode 92 over line 92 to the delay gate generator 52. The output of generator 52 is effective over line 53 to maintain electronic switch 45 stationary in the position shown in FIG. 5 by preventing the voltage at 94 in generator 52 from rising above zero volts. In this condition, the intermediate lines (as well as alternate lines) pass through the intermediate line delay unit without any delay. The video output of the intermediate line delay unit 34 produces satisfactory pictures in color, rather than black-and-white.

Figure 6:
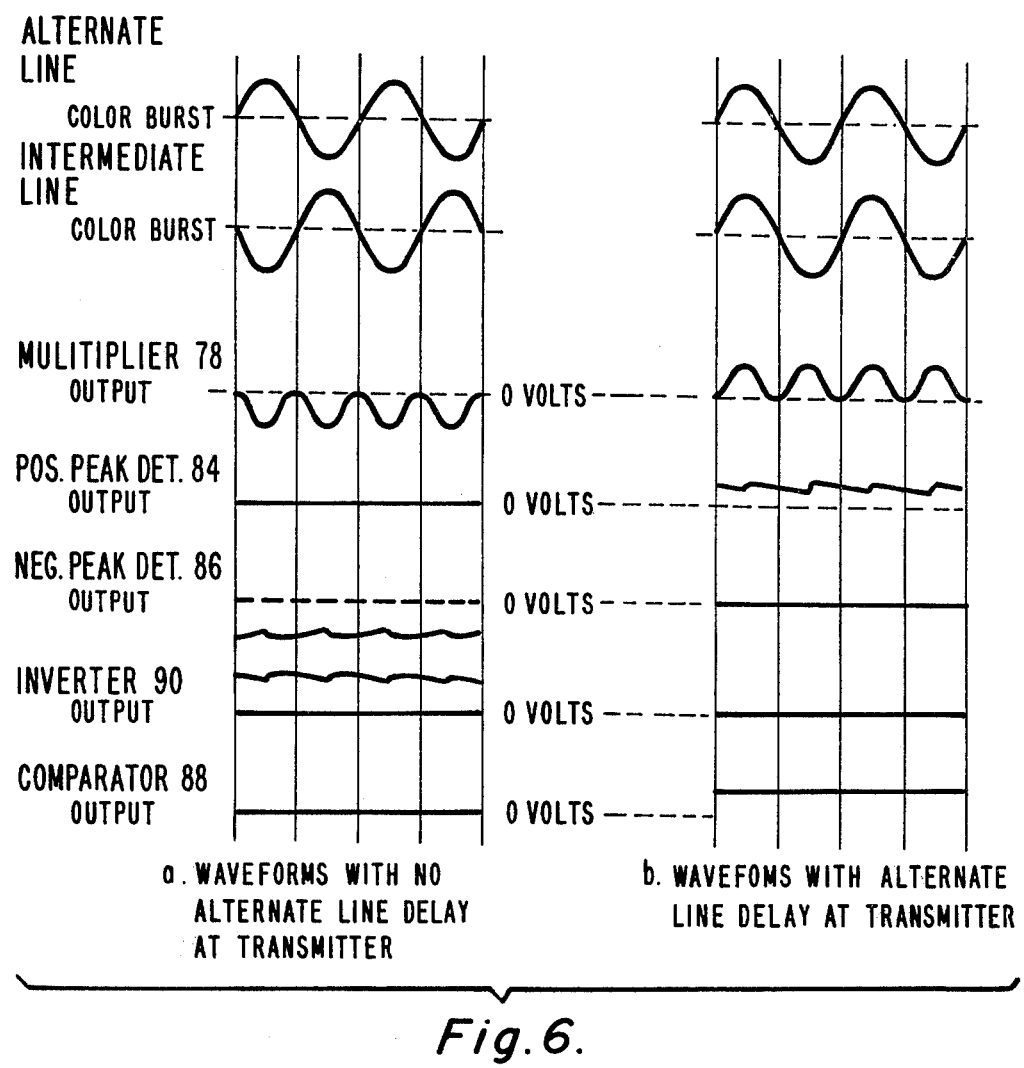
FIG. 6 is a chart of voltage waveforms which will be referred to in describing the operation of the circuit of FIG. 5.

FIG. 6b shows the waveforms existing when the alternate line delay unit 17 in FIG. 1 is operating properly. In this case, the output of multiplier 78 is positive, which produces a positive voltage at the output of positive peak detector 84 which causes a +5 volt output from comparator 88. This positive output back biases diode 92 and permits the intermediate line delay unit 34 to operate in the normal manner in which alternate lines are passed without delay and intermediate lines are delayed the same amount that alternate lines were delayed at the transmitting terminal.

Figure 7:
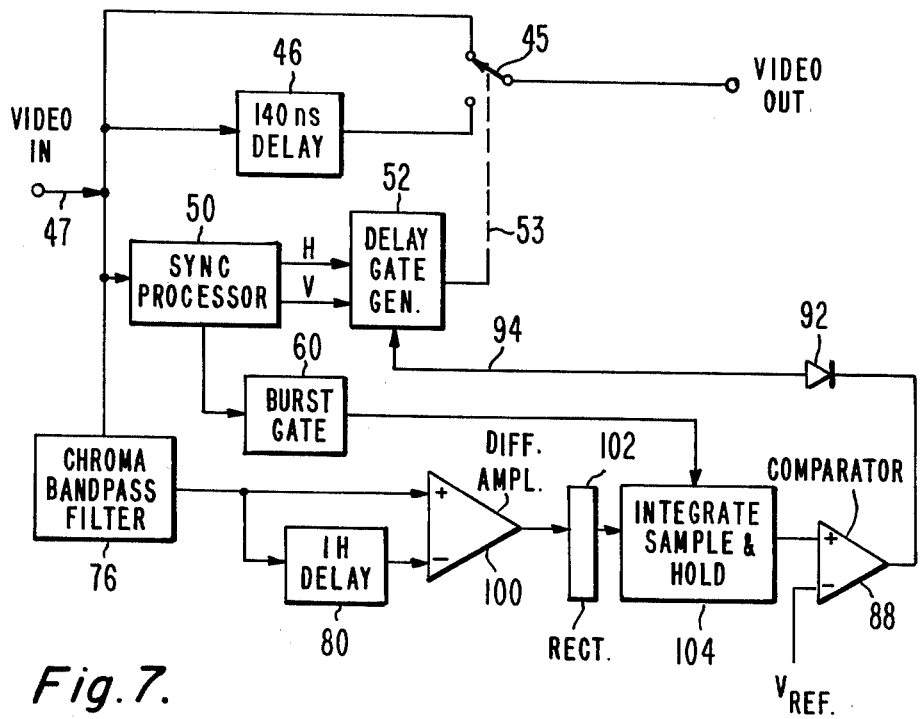
FIG. 7 is a diagram of an alternative to the arrangement shown in FIG. 6.

FIG. 7 shows an alternative arrangement which differs from the arrangement of FIG. 5 including a differential amplifier 100, a rectifier 102, and an integrate, sample and hold circuit 104. When there is a failure of the alternate line delay in the transmitting terminal and the alternate and intermediate line bursts have the opposite phases shown in FIG. 6a, the differential amplifier 100 produces an a.c. output which is rectified at 102 and held at 104 for application to comparator 88. The output of the comparator is zero volts which is coupled through diode 92 to delay gate generator to keep switch 45 in the position shown. When the conditions of FIG. 6b obtain, there is no a.c. output from differential amplifier 100, and no inhibiting signal is applied to delay gate generator 52.

Figure 8:
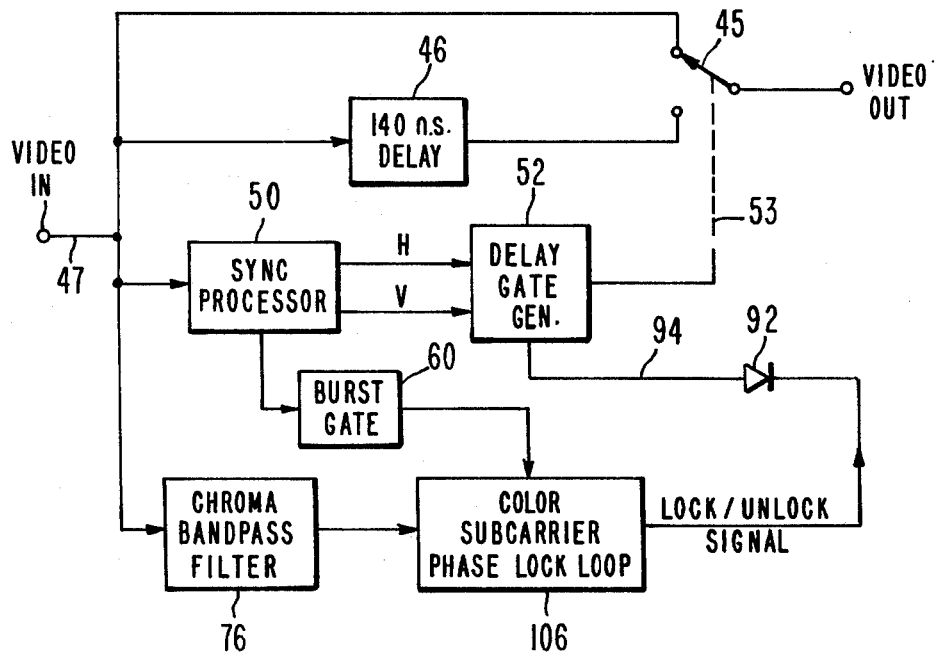
FIG. 8 is a diagram of another alternative to the arrangement shown in FIG. 5.

FIG. 8 shows still another alternative arrangement which differs in employing a color subcarrier phase lock loop 106 including a 3.58 MHz local oscillator. When there is a failure of the alternate line delay at the transmitting terminal, the phase lock loop 106 locks on to the received video signal because the received color bursts are continuous and of the same phase relative to each other (rather than relative to the horizontal sync pulses). A phase-lock-indicating signal from the loop 106 has the zero value to inhibit the delay of intermediate lines and maintain switch 45 in the position shown. A non-phase-lock-indicating signal from the loop 106, means that the alternate line delay unit at the transmitting terminal is operating satisfactorily, and has a value of +5 volts which permits the intermediate line delay unit 34 to operate in its normal manner.

What is claimed is:

1. In a system in which alternate lines of one color television video signal normally are delayed half the period of the color subcarrier at a transmitting terminal to minimize the cross modulation of the color subcarrier with the color subcarrier of another video signal amplified in a common amplifier such as in a satellite transponder, the combination of
   an intermediate line delay unit at the receiving terminal normally operative to delay intermediate lines of said one video signal half the period of the color subcarrier, and having an inhibit input, and
   inhibit signal generating means coupled to said inhibit input automatically to inhibit said intermediate line delay unit from delaying intermediate lines of said one video signal when the received alternate lines of said one video signal are not delayed at the transmitting terminal.

2. A system according to claim 1 in which said inhibit signal generating means includes means to compare the phases of color subcarrier bursts of succeeding alternate and intermediate lines of said one video signal.

3. A system according to claim 2 in which said inhibit signal generating means includes means to multiply the color subcarrier bursts of successive alternate and intermediate lines to produce a positive signal when the bursts are in phase and a negative signal when the bursts are out of phase.

4. A system according to claim 3 in which said inhibit signal generating means includes a comparator responsive to said negative signal to generate an inhibit signal.

5. A system according to claim 1 in which said inhibit signal generating means includes a differential amplifier responsive to successive alternate and intermediate to produce an alternating current signal when the two are out of phase, means to rectify the alternating current signal, means to integrate, sample and hold the rectified signal during the burst period, and a comparator to generate an inhibit signal.

6. A system according to claim 1 in which said inhibit signal generating means includes a color subcarrier phase lock loop including a burst frequency oscillator to produce an inhibit signal when the oscillator frequency fails to lock onto received bursts of successive alternate and intermediate lines.

* * * * *